(12) United States Patent
Laine et al.

(10) Patent No.: US 11,280,615 B2
(45) Date of Patent: Mar. 22, 2022

(54) THROUGH-CLOUD CELESTIAL SIGHTING SYSTEM

(71) Applicant: THE CHARLES STARK DRAPER LABORATORY, INC., Cambridge, MA (US)

(72) Inventors: Juha-Pekka J. Laine, Boston, MA (US); Stephen P. Smith, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 202 days.

(21) Appl. No.: 16/018,846

(22) Filed: Jun. 26, 2018

(65) Prior Publication Data
US 2018/0372496 A1    Dec. 27, 2018

Related U.S. Application Data

(60) Provisional application No. 62/524,887, filed on Jun. 26, 2017.

(51) Int. Cl.
     *G01C 21/02*      (2006.01)
     *G05D 3/20*      (2006.01)
     (Continued)

(52) U.S. Cl.
     CPC ........... *G01C 21/025* (2013.01); *B64G 1/361* (2013.01); *G01S 3/7867* (2013.01); *G01S 7/4861* (2013.01);
     (Continued)

(58) Field of Classification Search
     CPC ..... G01C 21/025; B64G 1/361; G01S 3/7867; G01S 7/4861; G01S 17/66; G01S 17/88;
     (Continued)

(56) References Cited

U.S. PATENT DOCUMENTS

| | | | | |
|---|---|---|---|---|
| 3,499,156 A | * | 3/1970 | Bushnell | B64G 1/244 |
| | | | | 250/203.6 |
| 3,502,388 A | * | 3/1970 | Mary | G02B 6/06 |
| | | | | 385/119 |

(Continued)

FOREIGN PATENT DOCUMENTS

| | | |
|---|---|---|
| FR | 3031807 A1 | 7/2016 |
| JP | 4875879 B2 * | 2/2012 |
| WO | 2008044931 A1 | 4/2008 |

OTHER PUBLICATIONS

NPL English Translation of Abe (JP-4875879-B2) (Year: 2012).*

(Continued)

*Primary Examiner* — Geepy Pe
*Assistant Examiner* — Bakari Underwood
(74) *Attorney, Agent, or Firm* — George Jakobsche Patent Counsel PLLC

(57) ABSTRACT

A wide field-of-view celestial sighting system and method are provided. The method includes orienting an imaging optic to collect light from at least one light source, such as at least one celestial body, the imaging optic being secured to a platform. The method further includes selectively collecting light from the at least one celestial body through a selective light collector secured to the platform and positioned in an imaging surface, such as an imaging plane, of the imaging optic. The method further includes combining forward scattered light from the at least one celestial body to provide a combined forward scattered light, and detecting a light intensity of the combined forward scattered light. Systems for performing the method are provided.

9 Claims, 7 Drawing Sheets

(51) Int. Cl.
  *G02B 6/06* (2006.01)
  *G02B 27/40* (2006.01)
  *G02F 1/29* (2006.01)
  *G01S 17/88* (2006.01)
  *G01S 3/786* (2006.01)
  *G01S 7/4861* (2020.01)
  *G01S 17/66* (2006.01)
  *B64G 1/36* (2006.01)

(52) U.S. Cl.
  CPC .............. *G01S 17/66* (2013.01); *G01S 17/88* (2013.01); *G02B 6/06* (2013.01); *G02B 27/40* (2013.01); *G02F 1/29* (2013.01); *G05D 3/20* (2013.01); *G02F 1/291* (2021.01)

(58) Field of Classification Search
  CPC .. G02B 6/06; G02B 27/40; G02F 1/29; G02F 2001/291; G05D 3/20
  See application file for complete search history.

(56) References Cited

U.S. PATENT DOCUMENTS

| | | | |
|---|---|---|---|
| 4,491,727 A | 1/1985 | Appelbaum et al. | |
| 4,942,291 A | 7/1990 | Dietrich | |
| 7,567,341 B2* | 7/2009 | Dolfi | G06F 3/0317 356/28 |
| 8,403,527 B2* | 3/2013 | Brukilacchio | G02B 27/0955 362/235 |
| 8,809,761 B1* | 8/2014 | Hunt | G01S 3/784 250/214 R |
| 2006/0158662 A1* | 7/2006 | Schelinski | G01B 11/24 356/602 |
| 2011/0079215 A1* | 4/2011 | Xiang | F24S 23/77 126/600 |
| 2011/0163222 A1* | 7/2011 | Moser | G01S 3/7861 250/203.4 |
| 2015/0373240 A1* | 12/2015 | Ishihara | G02B 6/06 348/359 |
| 2018/0039055 A1* | 2/2018 | Arbore | G02B 21/0016 |
| 2018/0341003 A1* | 11/2018 | Jungwirth | G01S 3/7867 |
| 2019/0133449 A1* | 5/2019 | Flusberg | A61B 5/0059 |
| 2020/0041715 A1* | 2/2020 | Lee | G02F 1/1335 |

OTHER PUBLICATIONS

International Search Report and the Written Opinion of the International Searching Authority from corresponding PCT/US2018/039565 dated Nov. 7, 2018.

\* cited by examiner

THROUGH-CLOUD CELESTIAL SIGHTING SYSTEM

CROSS REFERENCE TO RELATED APPLICATION

This application claims priority under 35 U.S.C. § 119(e) to co-pending U.S. Provisional Application Ser. No. 62/524,887 titled "THROUGH-CLOUD CELESTIAL SIGHTING SYSTEM," filed on Jun. 26, 2017, which is incorporated herein by reference in its entirety.

BACKGROUND

Known locations of celestial bodies are commonly used as landmarks to assist in navigation. A person can rely on the location of a star in the night sky as a reference point for establishing his or her heading. For example, a person in Earth's Northern Hemisphere can use the location of Polaris (commonly known as the North Star) and other stars, such as stars in a constellation, in the night sky to determine which direction is north. Then the person can choose a heading based on that determination and based on a map. However, on a cloudy night, light from stars is scattered by the clouds. In such situations, a person would have to rely on other navigational landmarks or navigational tools, such as a global positioning system (GPS).

SUMMARY

The present disclosure relates generally to a system and method for celestial sighting. In particular, aspects and embodiments provide a method and a system that are useful for through-cloud celestial sighting and for determining a navigational parameter based on the through-cloud celestial sighting.

According to an aspect of the present disclosure, a wide field-of-view celestial sighting system for viewing a plurality of light sources is provided. In some embodiments, the system includes a platform; an imaging optic secured to the platform and configured to focus light from a plurality of light sources onto an imaging surface; a selective light collector secured to the platform and positioned in the imaging surface of the imaging optic, the selective light collector configured to allow forward scattered light from each of the plurality of light sources to pass through the selective light collector; and a light detector configured to receive the forward scattered light from the selective light collector and configured to sense an intensity of the forward scattered light.

In some embodiments, the imaging surface is an imaging plane. In some embodiments, the imaging surface is not flat. In some embodiments, the imaging surface is curved.

In some embodiments, the system further includes at least one selective light collector actuator; and at least one processor configured to cause the at least one selective light collector actuator to maximize the intensity of the forward scattered light sensed by the light detector by rotating the selective light collector about one or more axes and/or translating the selective light collector, the at least one processor being further configured to determine a navigational parameter based on one or more of a position and an orientation of the selective light collector.

In some embodiments, the at least one selective light collector actuator is configured to cause the selective light collector to oscillate within the imaging plane.

In some embodiments, the one or more axes includes two orthogonal axes.

In some embodiments, the selective light collector is a liquid crystal display (LCD).

In some embodiments, the system includes at least one processor configured to maximize the intensity of forward scattered light sensed by the light detector by at least one of activating and deactivating one or more pixels in the LCD, and to determine a navigational parameter based on a set of pixels that are deactivated when a maximum intensity of forward scattered light is sensed by the light detector.

In some embodiments, the selective light collector is configured to allow only forward scattered light from each of the plurality of light sources to pass through the selective light collector, and is configured to block light from any other light sources from passing through the selective light collector.

In some embodiments, the selective light collector is a plurality of optical fibers. In some embodiments, each optical fiber has a first end and a second end, the first end positioned to collect the forward scattered light from the imaging plane, and the second end positioned to direct the forward scattered light to the light detector.

In some embodiments, one of the first ends is individually movable within the imaging plane, and the system further comprises a cable actuator configured to move the one of the first ends.

In some embodiments, the system includes a collection optic, wherein the selective light collector is a mask with a plurality of holes, and the mask is positioned between the collection optic and the imaging optic.

In some embodiments, the imaging optic is a ball lens.

In some embodiments, the light detector is a single pixel.

In some embodiments, the system further includes at least one processor configured to compare the intensity of the forward scattered light sensed by the light detector to a predetermined value, and at least one actuator that is configured to rotate the selective light collector about one or more axes to maximize the intensity of the forward scattered light sensed by the light detector and/or that is configured to translate the selective light collector to maximize the intensity of the light sensed by the light detector.

In some embodiments, the selective light collector is configured to collect light from a plurality of celestial bodies, and the selective light collector is configured to mask light from other sources.

According to another aspect of the present disclosure, a method of wide field-of-view celestial sighting for detecting light from at least one light source is provided. In some embodiments, the method includes orienting an imaging optic to collect light from at least one light source, the imaging optic secured to a platform; selectively collecting light from the at least one light source through a selective light collector secured to the platform and positioned in an imaging surface of the imaging optic; combining forward scattered light from the at least one light source to provide a combined forward scattered light; and detecting a light intensity of the combined forward scattered light.

In some embodiments, the imaging surface is an imaging plane. In some embodiments, the imaging surface is not flat. In some embodiments, the imaging surface is curved.

In some embodiments, the method includes maximizing the light intensity of the combined forward scattered light that passes through the selective light collector by rotating the selective light collector about one or more axes and/or translating the selective light collector.

In some embodiments, the one or more axes includes two orthogonal axes.

In some embodiments, the method includes oscillating the selective light collector about an orientation set point that is matched to an optimal orientation having a maximum detected light intensity of the combined forward scattered light; detecting fluctuations in the light intensity based on oscillation of the selective light collector; and adjusting the orientation set point to maximize the light intensity when the optimal orientation changes.

In some embodiments, the method includes determining a navigational parameter based on an adjustment to the orientation set point.

In some embodiments, the selective light collector is an LCD, and the method further comprises determining a navigational parameter based on a set of pixels of the LCD that are deactivated when a maximum intensity of the combined forward scattered light is sensed by the detector.

In some embodiments, the selective light collector is an LCD and the platform is supported on a frame, and the method further comprises compensating for rotation of the frame by selectively activating pixels of the LCD.

According to another aspect, a method of wide field-of-view celestial sighting includes orienting an imaging optic to collect light from at least one celestial body, the imaging optic secured to a platform, selectively collecting light from the at least one celestial body through a selective light collector secured to the platform and positioned in an imaging plane of the imaging optic, combining forward scattered light from the at least one celestial body to provide a combined forward scattered light, and detecting a light intensity of the combined forward scattered light.

In some embodiments, the method includes adjusting an orientation of the selective light collector to maximize the light intensity of the combined forward scattered light.

In some embodiments, the method includes oscillating the selective light collector about an orientation set point that is matched to an optimal orientation having a maximum detected light intensity to detect fluctuations in the light intensity based on oscillation of the light collector, and adjusting the orientation set point to maximize the light intensity when the optimal orientation changes.

In some embodiments, the method includes determining a navigational parameter.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
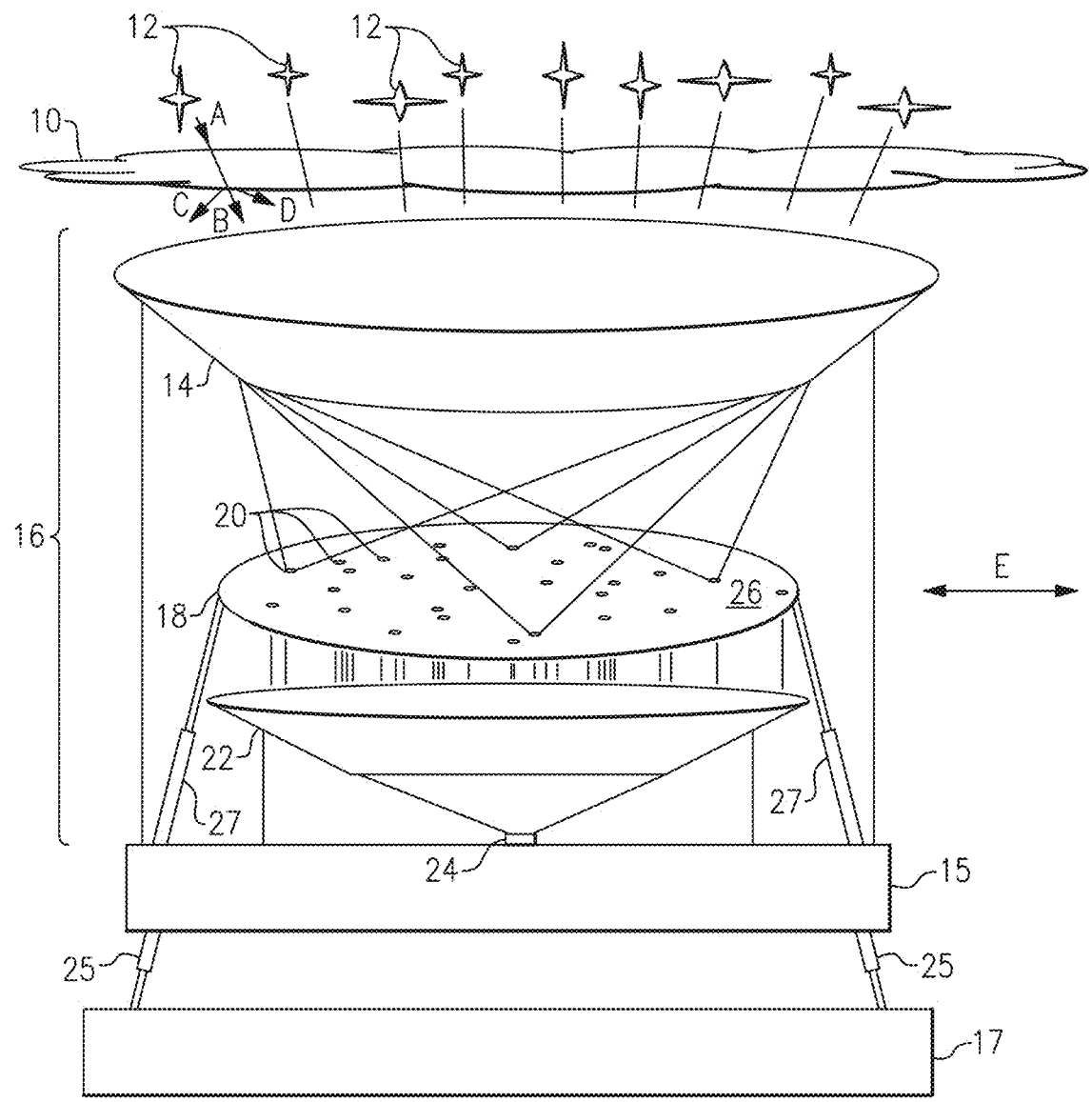
FIG. 1 is a diagram of one example of a wide field-of-view celestial sighting system according to aspects of the present invention.

Collecting light from celestial bodies through clouds presents challenges with respect to tracking the celestial bodies. The clouds scatter light from the celestial bodies, as shown in FIG. 1. This scattering conceals the location of the celestial body from an observer on the Earth. For example, on a cloudy day, an observer on the Earth can find it difficult to determine the location of even a body as bright as the Sun in the sky. Although the light is scattered in many directions by the clouds, some of the light from a celestial body is scattered in a forward direction toward the observer.

The forward-scattered light is correlated with the direction from an observer to the light source. While cloudy conditions normally scatter the light from a light source, making it difficult to determine the location of the source, a system can be used to track the location of a celestial body by filtering out all of the scattered light except the forward-scattered light. Essentially, this process removes the "noise" from the light, and keeps only the light that actually contains the directional information for a celestial body. Accordingly, systems and methods discussed herein are capable of tracking the location of one or more light sources, such as one or more celestial bodies, even under light-scattering conditions.

Referring to FIG. 1, the forward direction is the direct line of sight between a celestial body 12 and an imaging optic 14. FIG. 1 shows light from one of the celestial bodies 12 traveling along path A to a cloud 10, where the light is scattered in multiple directions. The light along arrow B is forward scattered to the imaging optic 14. The light along arrows C and D is scattered in other directions. As discussed in more detail below, the forward-scattered light can be detected by the wide field-of-view celestial sighting system 16 and used to track the celestial body 12.

The systems and methods of the present disclosure may be used during daytime and/or nighttime to track light sources, such as celestial bodies.

Aspects and embodiments are directed to a system and a method that uses a selective light collector positioned in the focal plane of an imaging optic (e.g., a lens) to enhance the collection of light from celestial bodies. In particular, certain embodiments provide a system and method for collecting light that is forward scattered from a plurality of light sources (for example, celestial bodies, such as stars and planets), tracking the position of the celestial bodies, and determining the orientation of the system relative to the tracked celestial bodies. The amount of light that is forward scattered from a single celestial body is typically very small relative to the total amount of light that is scattered from that single celestial body. As described in further detail below, in one aspect, forward scattered light from a plurality of celestial bodies is gathered by a wide field-of-view lens and focused onto an imaging surface, added together at the imaging surface, and piped from the imaging surface to a single detector. In some embodiments, the collected light that is added together from the plurality of celestial bodies is an integration of received light, but is not an image at the location of the light detector.

In some embodiments, the imaging surface (focal surface) is an imaging plane (focal plane). In some embodiments, the imaging surface is not flat. In some embodiments, the imaging surface is curved.

In some embodiments, the selective light collector is a mask, a liquid crystal display (LCD), a set of fiber optic cables, or another selective light collector.

In the first embodiment 16 of the wide field-of-view celestial sighting system shown in FIG. 1, an imaging optic 14 can be used to form an image of celestial bodies at an imaging plane 26. At the imaging plane 26, a selective light collector in the form of a mask 18 filters the image so that forward scattered light from a selected set of celestial bodies passes through the mask 18 to a collection optic 22, and so that other scattered light is at least substantially blocked from passing through the mask 18. In some embodiments, the selective light collector allows only forward scattered light from a selected set of light sources to pass through the selective light collector, while blocking any light from other light sources from passing through the selective light collector. The collection optic 22 directs the light to a light detector 24. When the mask is properly oriented in the imaging plane, the intensity of the light at the detector is a relative maximum intensity. Movement of the mask away from the proper orientation will cause the light intensity measured at the detector to decrease from the relative maximum intensity.

The imaging optic 14 is secured to a platform 15. The platform is linked to a frame 17. In some embodiments, the frame 17 is part of a vehicle. In some embodiments, the frame 17 is secured to a vehicle. In some embodiments, the vehicle is capable of traveling by land, sea and/or air. In some embodiments, the vehicle is an automobile. In some embodiments, the vehicle is an airplane. In some embodiments, the vehicle is a boat. In some embodiments, the vehicle is an amphibious vehicle.

The platform 15 and the frame 17 are linked in a way that allows movement of the platform 15 relative to the frame 17. As the frame 17 translates and rotates in three-dimensional space, the platform 15 is translatable and rotatable in three-dimensional space with respect to the frame 17 so that the imaging optic 14 can be adjusted to track at least one celestial body, such as a star or a planet, and to focus the image onto the imaging plane (the focal plane) 26.

In some embodiments, the imaging optic 14 has a wide field-of-view. In some embodiments, the imaging optic 14 is a very-wide field-of-view imaging optic that allows the celestial sighting system to collect light over large portions of the sky at once. In some embodiments, wide field-of-view refers to a viewing angle in the range of 5° to 25°. In some embodiments, wide field-of-view refers to a viewing angle in the range of 5° to 40°. In some embodiments, very wide field-of-view refers to a viewing angle in the range of 40° to 180°. In some embodiments, very wide field-of-view refers to a viewing angle in the range of 90° to 180°.

In some embodiments, the imaging optic is a convex lens. In some embodiments, the imaging optic is a ball lens. In some embodiments, the imaging optic is another type of lens. In various embodiments, the imaging optic 14 is a lens, or similar to a lens, of a digital single lens reflex (SLR) camera. The lens focuses the image onto the imaging plane (focal plane) of the device. The sharp points of the image are directed to holes in the mask on the focal plane. The holes are through-holes in the mask.

At the imaging plane, the sky image is sampled in such a way that only light from the forward direction of celestial bodies 12 is collected while all other background light is blocked. For this purpose, a selective light collector is secured to the platform and is positioned at the imaging plane of the imaging optic 14.

In some embodiments, the selective light collector is made of metal or another material that does not allow photons to pass through the material of the selective light collector. In some embodiments in which the selective light collector is made from metal, holes are machined in the metal plate to allow forward scattered light corresponding to a set of celestial bodies to pass through the selective light collector. In some embodiments, the selective light collector is made from a material other than metal and is then coated with metal.

In some embodiments, the selective light collector is a mask that is flat. In some embodiments, the selective light collector is a mask that is curved. For example, if the imaging optic has a flat focal plane, a flat mask is used. If the imaging optic has a curved focal plane, a curved mask is used.

In the embodiment of FIG. 1, the selective light collector is a mask 18. A plurality of holes 20 are defined in the mask 18, and are patterned to overlap with the locations of light from a specific plurality of celestial bodies 12 projected in the imaging plane by the imaging optic 14, so that each hole of the plurality of holes 20 allows light from one celestial body 12 of the plurality of celestial bodies to pass through the mask 18 when the mask 18 is properly oriented.

Movement of the clouds 10 causes a change in the intensity of light from the celestial bodies 12 that passes through the mask 18. If the number of holes in the mask 18 is too small, there is a risk that the system may react to a change in light intensity at the detector that is due to cloud movement as if it were a change in light intensity at the detector that is due to a change in heading of the system. To compensate for this, the mask 18 includes a sufficiently large number of holes 20 to track a sufficiently large number of celestial bodies 12. The mask may include any number of holes 20. However, a number of holes that is too great would risk the selective light collector allowing passage of some scattered light that is not forward scattered light from the selected celestial bodies. The minimum number of celestial bodies that the system tracks is two celestial bodies. In some embodiments, the system tracks thousands of celestial bodies. In some embodiments, the system tracks tens-of-thousands of celestial bodies, or more. In some embodiments, the mask 18 includes two holes. In some embodiments, the mask 18 includes hundreds of holes. In other embodiments, the mask 18 includes thousands of holes. In some embodiments, the mask 18 includes hundreds of thousands of holes. In one example, the mask 18 includes 100,000 holes, with each hole in the mask corresponding to the location of a celestial body projected onto the imaging plane. In some embodiments, the mask 18 only collects (allows the pass through of) light from the respective 100,000 celestial bodies, and only collects light that is forward scattered from the respective 100,000 celestial bodies.

In some embodiments, the mask has a profile in the imaging plane with sides in the range of 0.2 inch to 4 feet. In some embodiments, the mask has a square profile in the imaging plane, with sides of 0.25 inch. In some embodiments, the mask has a square profile in the imaging plane, with sides of 3 feet. In some embodiments, the holes in the mask have a diameter in the range of 0.5 micrometer to 3 millimeters. In some embodiments, the holes in the mask have a diameter of 0.5 micrometer. In some embodiments, the holes in the mask have a diameter of 1 millimeter. The holes are dimensioned to allow light to pass through to the collection optic. In some embodiments, the light that can pass through the mask is not limited to visible light.

The selective light collector, such as the mask 18, is positioned between the imaging optic 14 and a collection optic 22, as shown in FIG. 1. In various embodiments, the collection optic maybe a convex lens, a plano-convex lens, a Fresnel lens or any other appropriate type of lens. The collection optic 22 collects the light that passes through the selective light collector (in this case, mask 18) simultaneously from all the sampled celestial body locations, and directs the light to a light detector 24 that is configured to receive light from the selective light collector. In particular, the light detector 24 is configured to receive forward scattered light from the selective light collector, and to sense an intensity of the forward scattered light. In certain examples the light that is fed into the light detector 24 is detected as a combined light signal. That is, an image of the field of celestial bodies 12 is not created at the light detector 24, but instead the forward-scattered light from each of the celestial bodies 12 is captured and integrated to produce single combined intensity measurement. In such cases, the detector serves as a light intensity power meter. In some embodiments, the detector includes at least one photo-sensitive pixel. In some embodiments, the detector is an array of photo-sensitive pixels for sensing light. In some embodiments, the detector is only a single photo-sensitive pixel for sensing light. In the embodiment of FIG. 1, the detector 24 includes a single photo-sensitive pixel.

In embodiments in which the light detector 24 includes more than one pixel, the light detector 24 may be used to detect light in different parts of the sky. For example, in some embodiments, the light detector 24 includes two pixels, and a first one of the pixels is used to detect light from celestial bodies in the eastern part of the sky and a second one of the pixels is used to detect light from celestial bodies in the western part of the sky. If the cloud coverage is heavier in the eastern part of the sky than in the western part of the sky, the first pixel would detect a relatively low light intensity compared to the light intensity detected by the second pixel.

In some embodiments in which the light detector 24 includes more than one pixel, the light intensity detected by the two pixels can be averaged by a processor in communication with the light detector. This averaging can be used when the light detectors are used to detect light intensity in different parts of the sky, or can be used when the system includes more than one imaging optic. For example, in some embodiments in which the light detector 24 includes more than one pixel, the system may include more than one selective light collector and/or more than one imaging optic. In some such embodiments, the first imaging optic is associated with a first selective light collector and a first pixel of the light detector, while the second imaging optic is associated with a second selective light collector and a second pixel of the light detector. By monitoring different parts of the sky or by including two imaging optics that independently monitor the same sky, it may be possible to provide more robust tracking of celestial bodies.

If the selective light collector (in FIG. 1, mask 18) is properly oriented, the sum of all the light scattered forward through the clouds 10 will provide a maximum light intensity value measured by the detector 24, relative to the light intensity values of other respective orientations of the selective light collector. Given constant cloud 10 coverage, any change in the orientation of the selective light collector (in FIG. 1, mask 18) from this orientation causes a decrease in the light intensity measured by the detector 24. By monitoring the intensity of light collected from only a certain set of celestial bodies 12, an orientation of the light collector can be determined. For given sky conditions, whether cloudy or not, the amount of detected light is maximum when the selective light collector (in FIG. 1, the mask 18) is oriented such that the pattern of holes 20 exactly matches the positions of light from the celestial bodies in the imaging plane. In a mobile star-tracker application, the imaging optic and the selective light collector are maneuvered to maintain the star pattern precisely, maximizing the optical signal detected by detector 24 by matching the movements of the star tracker and its platform.

Figure 6:
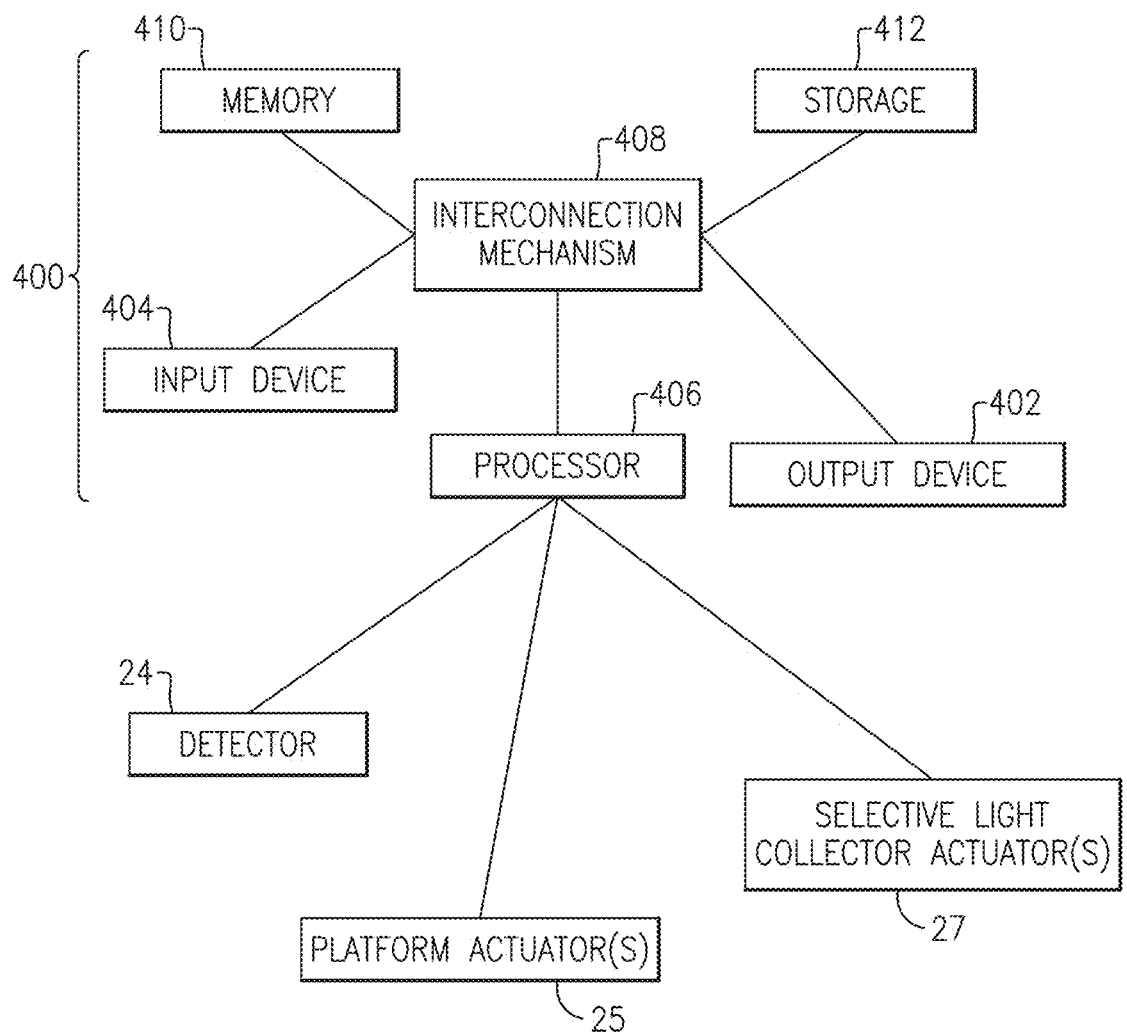
FIG. 6 is a block diagram of a system upon which various embodiments of the celestial sighting systems and methods disclosed herein may be implemented.

As discussed further in relation to FIG. 6, a processor 406 is in communication with the detector 24. The processor is also in communication with one or more platform actuators 25, and one or more selective light collector actuators 27. The processor 406 is configured to receive a signal from the detector 24 that corresponds to an intensity measurement of the light sensed by the light detector 24. The processor 406 is further configured to compare the signal to a value corresponding to a previous intensity measurement and/or a known maximum intensity measurement. The processor 406 is configured to determine whether the current measurement is above or below the previous value, and/or is configured to determine whether the current measurement is equal to the known maximum intensity measurement. The processor 406 is further configured to control the platform actuator(s) 25 and the selective light collector actuator(s) 27 in response to one or more of such determinations regarding the intensity of the light sensed by the light detector 24.

The one or more platform actuators 25 are configured to orient the imaging optic 14, along with the collection optic 22, the mask 18, and the detector 24, with respect to the frame 17 to focus a sky view onto the imaging plane 26. For example, in some embodiments, the one or more platform actuators 25 are configured to rotate and/or translate the platform 15 relative to one or more axes. In some embodiments, the one or more platform actuators 25 are configured to rotate the platform 15 about two orthogonal axes. The one or more selective light collector actuators 27 are configured to positionally orient the selective light collector, such as mask 18, to maximize the amount of light sensed by the light detector 24. For example, in some embodiments, the one or more selective light collector actuators 27 are configured to rotate and/or translate the selective light collector with respect to one or more axes. In some embodiments, the one or more selective light collector actuators are configured to rotate the selective light collector about two orthogonal axes. In some embodiments, the one or more selective light collector actuators are configured to rotate the selective light collector about three orthogonal axes.

Each platform actuator may be a linear actuator, a rotary actuator, a chain actuator, or another type of actuator. In some embodiments, each platform actuator is a hydraulic actuator. In some embodiments each platform actuator is a pneumatic actuator. In some embodiments, each platform actuator is an electric actuator. In some embodiments, each platform actuator is a mechanical actuator. In some embodiments, there is a plurality of platform actuators. In some embodiments, the plurality of platform actuators includes two platform actuators. In some embodiments, the plurality of platform actuators includes three platform actuators. In some embodiments, more than one platform actuator is used, and the platform actuators are not all the same type of actuator.

The position of the selective light collector can be constantly adjusted to maximize the light collection through the selective light collector. In some embodiments, the one or more selective light collector actuators serve two important roles. First, the one or more selective light collector actuators allow for coarse movement of the selective light collector to match the movement of the vehicle on which the platform is mounted. Second, the one or more selective light collector actuators allow for continuous confirmation that the selective light collector is properly oriented for maximum light detection.

Each selective light collector actuator may be a linear actuator, a rotary actuator, a chain actuator, or another type of actuator. In some embodiments, each selective light collector actuator is a hydraulic actuator. In some embodiments each selective light collector actuator is a pneumatic actuator. In some embodiments, each selective light collector actuator is an electric actuator. In some embodiments, each selective light collector actuator is a mechanical actuator.

In some embodiments, there is a plurality of selective light collector actuators. In some embodiments, the plurality of selective light collector actuators includes two selective light collector actuators. In some embodiments, the plurality of selective light collector actuators includes three selective light collector actuators. In some embodiments, more than one selective light collector actuator is used, and the selective light collector actuators are not all the same type of actuator.

In some embodiments, the selective light collector can be rotated to track the location of celestial bodies 12 in the sky. In some embodiments, such as in FIG. 1, the selective light collector can be both translated and rotated to track the location of celestial bodies 12 in the sky.

When the platform is mounted on an airplane, the system compensates for airplane movement and celestial body movement. The system can rotate the platform relative to the airplane, translate the platform relative to the airplane, and track the rotation of the Earth.

In some embodiments, the device is mounted on an airplane, and the mask 18 can be rotated with respect to the airplane to track the location of celestial bodies in the sky. If the airplane turns 90 degrees to the left, the mask rotates 90 degrees to the right to track the position of celestial bodies. This movement of the mask in response to movement of the airplane would depend on how the system is gimbaled. In some embodiments, the mask may need to rotate and translate in response to movement of the airplane to track the location of a set of celestial bodies. In some embodiments, the mask may need to rotate about more than one axis in response to movement of the airplane to track the location of a set of celestial bodies.

At low speeds and over short periods of time, such as one hour, most of the maneuvering of the platform may be due to the need to compensate for the motion of the platform itself or the object on which the platform is mounted, such as an airplane.

As discussed above, the one or more selective light collector actuators allow for continuous confirmation that the selective light collector is properly oriented for maximum light detection. The system is thus capable of determining one or more navigational parameters, such as a position or a heading of the system or of a vehicle on which the system is secured. In some embodiments of the present disclosure, the system is seeded with an initial known navigational parameter, and the selective light collector is oriented to maximize the intensity of forward scattered light corresponding to that navigational parameter. The initial known navigational parameter may be based on a navigational aid. In some embodiments, the initial known navigational parameter may be based on a map, determined by a GPS unit, or based on another navigational aid. Once the system is seeded with the initial known navigational parameter, the system adjusts the orientation of the selective light collector in response to the change the navigational parameter of the platform in real time, as discussed in relation to systems and methods described herein.

Even if the imaging optic is directed generally at the set of celestial bodies, if improper orientation of the selective light collector causes the system to lose the peak measurement of light at the detector 24, it may be difficult or impossible to re-orient the selective light collector. In some embodiments, the one or more selective light collector actuators are configured to cause the selective light collector to oscillate ("jitter") within the imaging plane. For example, the one or more selective light collector actuators may be configured to cause the selective light collector actuator to oscillate along the arrow E in FIG. 1. Microscopic oscillation (jittering movement) of the selective light collector allows the system to ensure that the selective light collector is collecting the peak amount of light from the set of celestial bodies. This enables generation of constant orientation fixes, as well as characterization of changes in scattering conditions. The jittering movement bandwidth needs to be fast enough for the system to track the celestial bodies. In some embodiments, the jittering movement vibrates the mask at 1 kHz to keep track of the light from the celestial bodies through the respective holes. The amplitude of the oscillation is selected to be of sufficient magnitude that the mask at least partially blocks forward scattered light from a selected set of celestial bodies to be tracked such that the detector senses a fluctuation in light intensity due to the oscillation. In some embodiments, the amplitude of the oscillation is of sufficient magnitude to cause the selective light collector to periodically entirely block the forward scattered light from a set of celestial bodies due the oscillation. In some embodiments, the amplitude of the oscillation is at least as great as a width of the holes in the selective light collector. For example, in some embodiments, the holes have a diameter of 0.5 micrometer, and the amplitude of the oscillation of the selective light collector in the imaging plane is 0.5 micrometer.

The light collector actuators oscillate the selective light collector about an orientation that is associated with a maximum detected light intensity. The processor monitors the light intensity detected by the detector 24, and the processor detects fluctuations in the light intensity based on oscillation of the selective light collector. The processor causes the selective light collector actuators to orient the selective light collector to maximize the light intensity when the orientation associated with maximum detected light intensity changes.

For example, when the mask is aligned at an origin coordinate (or a set point coordinate), the mask allows forward scattered light from a set of celestial bodies. When the mask is offset from the set point by a distance equal to the amplitude of the jittering motion, the mask at least partially blocks the forward scattered light from the set of celestial bodies. Then the mask moves back to the set point position. Then the mask is offset from the set point in an opposite direction by a distance equal to the amplitude of the jittering motion, and the mask at least partially blocks the forward scattered light from the set of celestial bodies.

The light detector detects the intensity of the forward scattered light as the mask oscillates. The at least one processor is capable of determining whether the maximum intensity of light occurs when the mask is at the set point position. If the maximum intensity of light occurs at another position of the mask, the processor can cause at least one platform actuator to translate and/or rotate the platform with respect to the vehicle and/or the processor can cause at least one selective light collector actuator to translate and/or rotate the selective light collector with respect to the platform so the selective light collector oscillates about a set point that is associated with the maximum light intensity detected by the detector, thereby maximizing the intensity of the forward scattered light sensed by the light detector.

The processor is configured to determine a navigational parameter based on one or more of a position and an orientation of the selective light collector. For example, by determining the position and orientation of the imaging optic with respect to one or more light sources, and by determining the position and orientation of the imaging optic with respect to a vehicle on which the imaging optic is secured, the processor can determine the position and orientation of the vehicle with respect to the one or more light sources.

Figure 2:
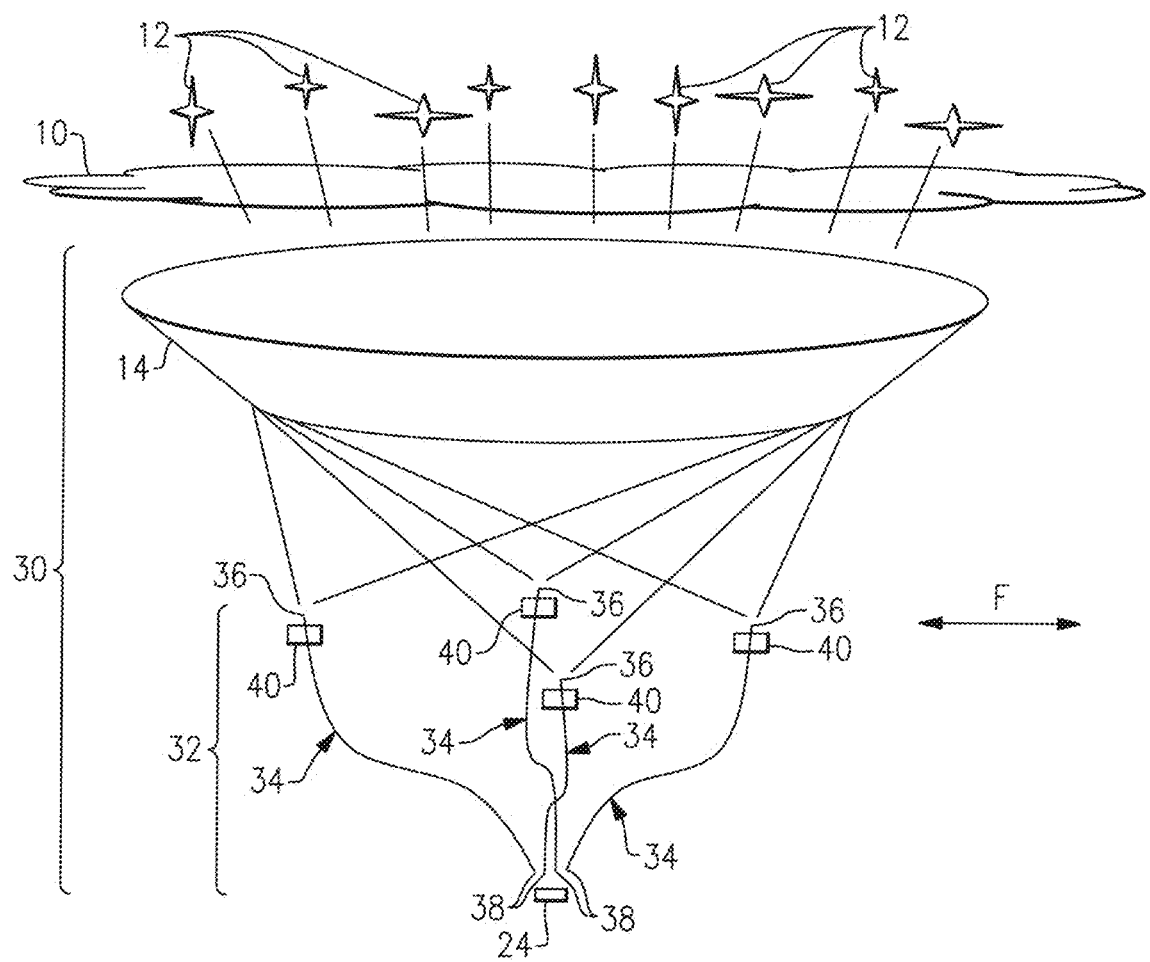
FIG. 2 is a diagram of another example of a wide field-of-view celestial sighting system according to aspects of the present invention.

Referring now to FIG. 2, there is illustrated a second embodiment 30 of a wide field-of-view celestial sighting system. This embodiment 30 is similar to the embodiment 16 of FIG. 1, but uses a fiber optic array 32 in place of the mask 18 of FIG. 1. The fiber optic array can be maneuvered in the imaging plane. The second embodiment 30 includes the imaging optic 14 and the light detector 24 that operate as discussed above.

In the embodiment of FIG. 2, the selective light collector is a plurality of optical fibers (fiber optic cables) 34 each having a first end 36 and a second end 38. The first end 36 of each optical fiber 34 is positioned to collect light from the imaging plane. Each first end 36 is positioned in the imaging plane. Each first end 36 is co-aligned with one of a set of imaged celestial object locations in the field-of-view. The second end 38 of each optical fiber 34 is positioned to direct light to the light detector 24, so that light from the imaging plane is directed through each optical fiber 34 from its first end 36 to the detector 24 adjacent its second end 38.

For at least one optical fiber 34, a cable actuator 40 is configured to move the first end 36 of the optical fiber 34, so that the first end 36 is individually movable within the imaging plane. In some embodiments, all of the first ends are moveable together by an array actuator. In some embodiments a first end 36 of an optical fiber 34 may be movable by at least one actuator relative to respective first ends 36 of other optical fibers 34. This may be useful where the position of a celestial body 12 moves with respect to the positions of other celestial bodies 12 within the sky. In some embodiments, each first end 36 of the fiber optic cables 34 has a respective actuator, so that a first end 36 of one fiber optic cable 34 can be moved independently of the first ends 36 of other fiber optic cables 34. In other embodiments, individual groups of one or more fibers are coupled to respective actuators such that each group of fibers can be moved independently of the other groups. In this way, the groups of one or more fibers are movable within the imaging plane to track the movement of one or more respective celestial bodies that move at a speed that is different from other celestial bodies in the field of view. For example, an individually movable fiber can be moved at a different speed relative to other fibers to track a fast-moving object, such as an object orbiting the Earth.

The cable actuators 40 are capable of the oscillation movement described in relation to FIG. 1 to each oscillate a respective first end 36 of one of the cables to ensure the first ends 36 are properly positioned. In embodiments including an array actuator, the array actuator is capable of the oscillation movement described in relation to FIG. 1 to oscillate the first ends 36 of the cables along the arrow F to ensure the first ends 36 are properly positioned.

As discussed above with respect the holes 20 in the mask 18, the number of fiber optic cables 34 may depend on the number of celestial bodies to be tracked. In some embodiments, hundreds of fiber optic cables 34 are used. In other embodiments, thousands of fiber optic cables 34 are used, and in other embodiments, hundreds of thousands of fiber optic cables 34 are used.

Figure 3:
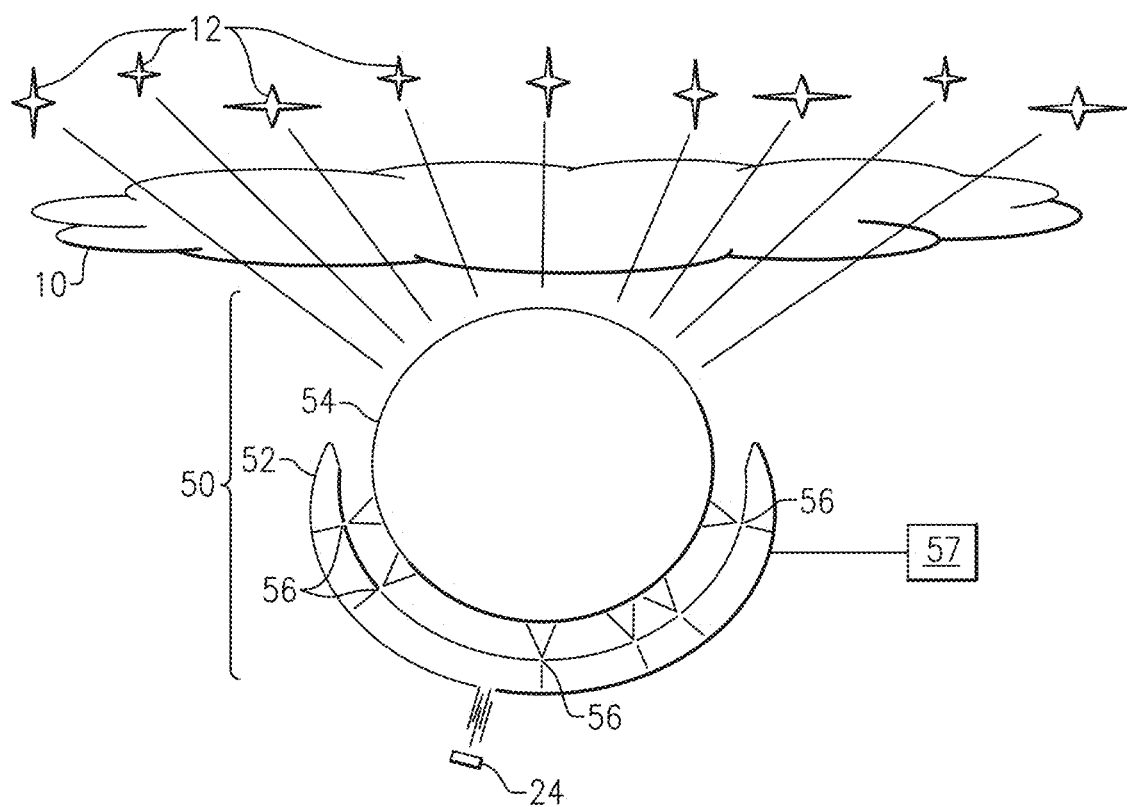
FIG. 3 is a diagram of another example of a wide field-of-view celestial sighting system according to aspects of the present invention.

Referring to FIG. 3, there is illustrated a third embodiment 50 of a wide field-of-view celestial sighting system. In the third embodiment 50, the imaging optic is a ball lens 54. A ball lens provides consistent optical performance over the entire field-of-view. For example, the ability of the ball lens to collect light over the entire field-of-view is constant, and the quality of the image resolution over the entire field-of-view is constant.

The ball lens 54 focuses light onto a selective light collector. In the third embodiment 50, the selective light collector is a curved mask 52. The curved mask 52 includes a plurality of holes 56 that are co-aligned with imaged celestial object locations in the field-of-view, in a similar manner as discussed above with reference to the mask 18 shown in FIG. 1.

In some embodiments, there are hundreds of holes 56 in the curved mask 52. In some embodiments, there are thousands of holes 56. In some embodiments, there are hundreds of thousands of holes 56. In some embodiments, there are 100,000 holes 56. Each hole in the mask corresponding to the location of a celestial body projected onto the imaging surface of the curved mask 52. In the example of a curved mask 52 having 100,000 holes, the curved mask 52 only collects (allows the pass through of) light from the respective 100,000 celestial bodies, and only collects light that is forward scattered from the respective 100,000 celestial bodies.

Movement of the clouds 10 causes a change in the intensity of light from the celestial bodies 12 that passes through the curved mask 52. If the number of holes in the curved mask 52 is too small, there is a risk that the system could react to a change in light intensity at the detector that is due to cloud movement as if it were a change in light intensity at the detector that is due to a change in heading of the system. To compensate for this, the curved mask 52 includes a sufficiently large number of holes 56 to track a sufficiently large number of celestial bodies 12. The mask may include any number of holes 56. However, a number of holes that is too great would risk the selective light collector allowing passage of some scattered light that is not forward scattered light from the selected celestial bodies. For example, in some embodiments, the curved mask 52 includes hundreds of holes. In other embodiments, the curved mask 52 includes thousands of holes. In some embodiments, the curved mask 52 includes hundreds of thousands of holes.

The curved mask 52 includes an optical waveguide. The optical waveguide in FIG. 3 is shown as an integrating shell.

The celestial light passes through the holes 56, and is directed by the integrating shell of the curved mask 52 to the detector 24.

The curved mask 52 can be oscillated by a selective light collector actuator 57, in a similar manner to that described above in relation to other selective light collectors, such as mask 18. The light collector actuators oscillate the selective light collector about an orientation that is associated with a maximum detected light intensity. The processor monitors the light intensity detected by the detector 24, and the processor detects fluctuations in the light intensity based on oscillation of the selective light collector. The processor causes the light collector actuators to orient the selective light collector to maximize the light intensity when the orientation associated with maximum detected light intensity changes.

In some embodiments, a ball lens could be used with a selective light collector in the form of fiber optic cables, similar to the fiber optic cables of FIG. 2.

Figure 4:
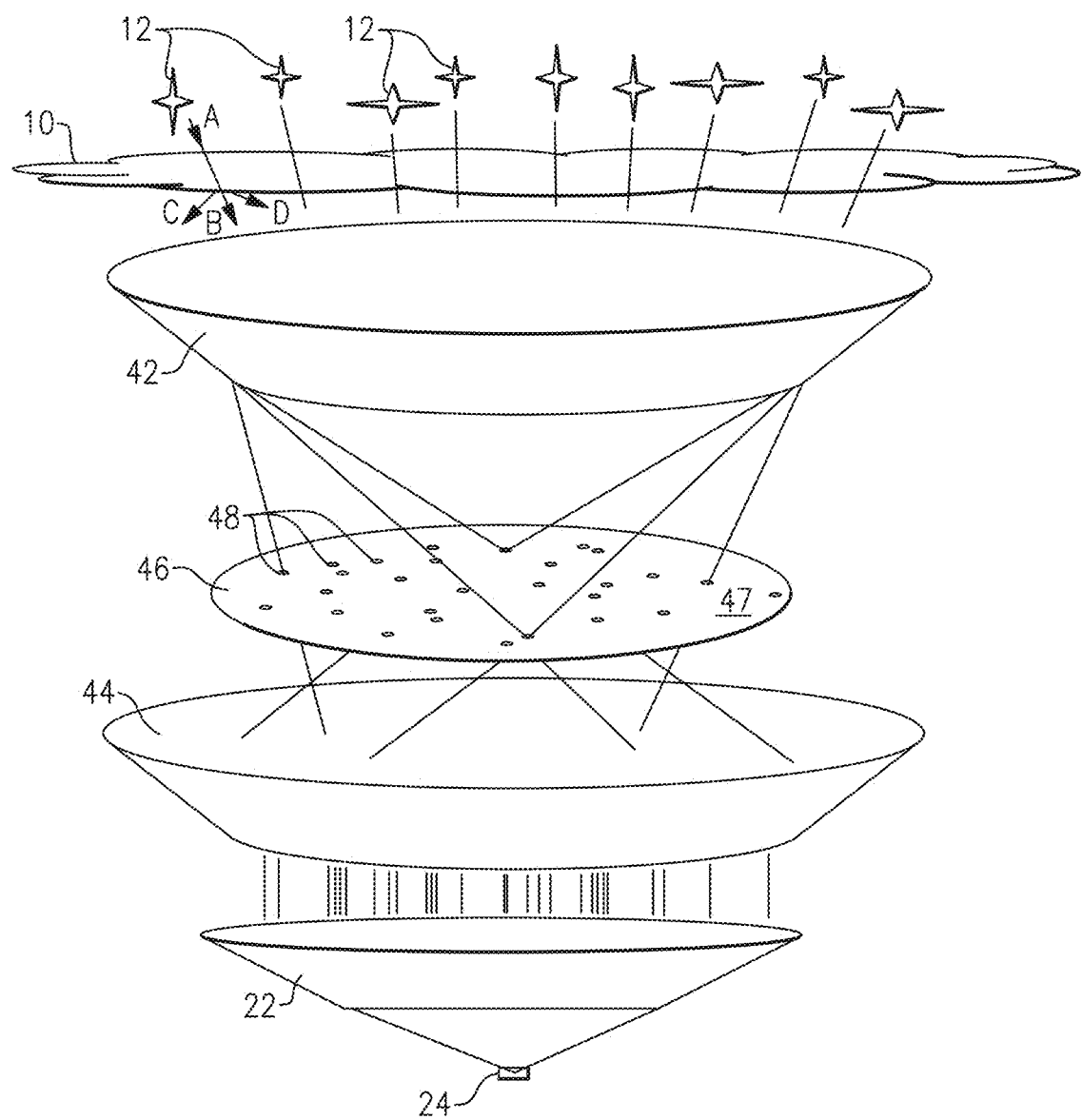
FIG. 4 is a diagram of an embodiment of a wide field-of-view celestial sighting system that includes two imaging optics in a relayed configuration.

In some embodiments, a mask can be placed in an intermediate image plane if, instead of one lens, the imaging optic is a relayed imager. FIG. 4 shows an embodiment having two imaging optics that are arranged in a relayed configuration. The structure of FIG. 4 includes some components that are the same as FIG. 1, such as the collection optic 22 and the detector 24. In place of the imaging optic 14 of FIG. 1 are a first imaging optic 42 and a second imaging optic 44. Light from the celestial bodies 12 passes through the first imaging optic 42, and is focused on an intermediate imaging plane. The intermediate imaging plane is located between the first imaging optic and the second imaging optic. A mask 46 is positioned in the intermediate imaging plane 47 of the relayed configuration. The mask 46 includes holes 48 that are located on the mask 46 to allow forward scattered light from the celestial bodies 12 to pass through the mask 46. The forward scattered light passes to the second imaging optic 44, which directs the light to the collection optic 22, which collects the forward scattered light and feeds it to the detector 24.

The mask in such a relayed configuration could be smaller than the mask of the embodiment of FIG. 1, and could have one of a variety of shapes. In some embodiments, a liquid crystal display (an LCD) can be used as the selective light collector.

Figure 5:
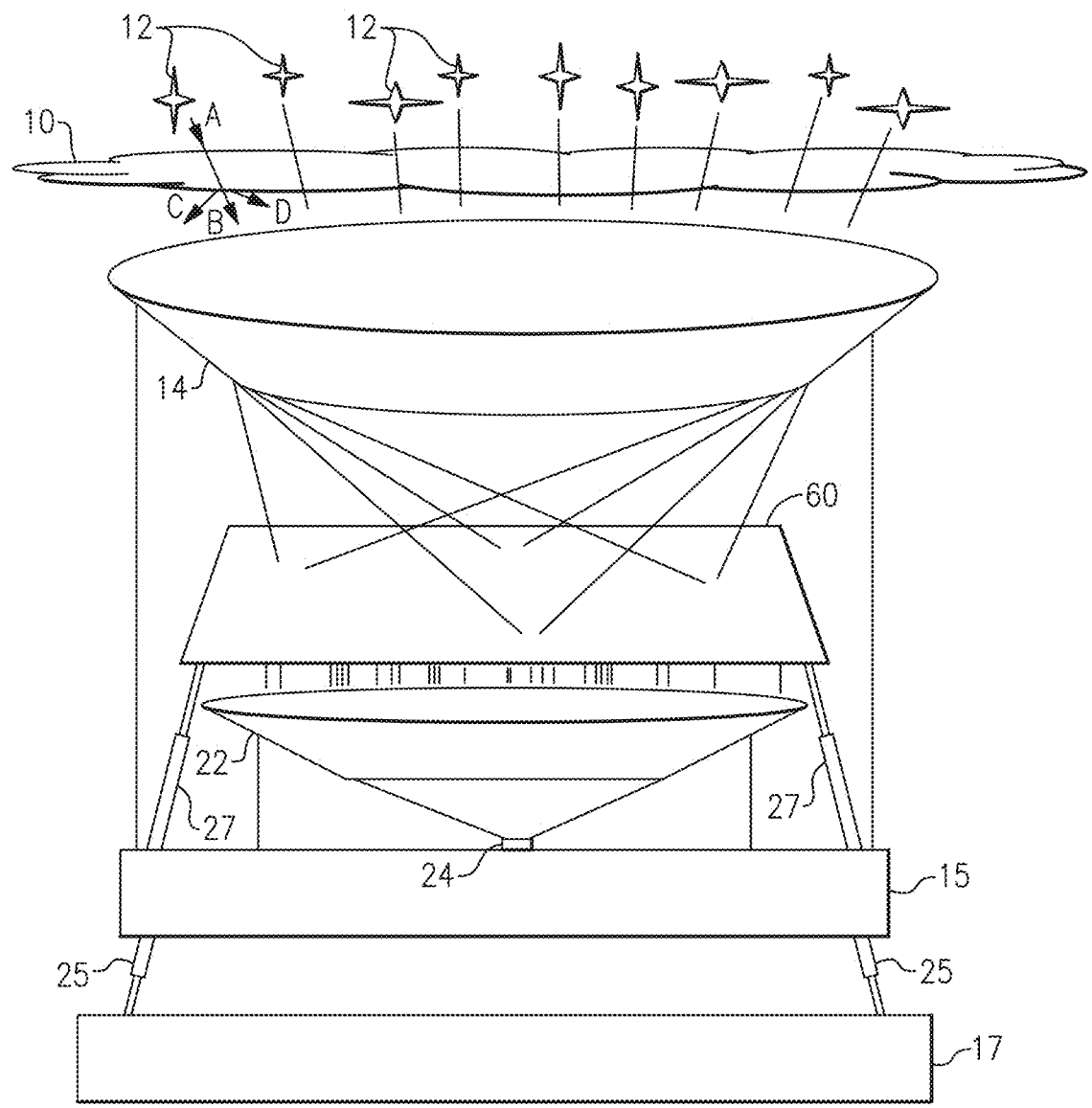
FIG. 5 is a diagram of another example of a wide field-of-view celestial sighting system according to aspects of the present invention.

FIG. 5 shows a system similar to the system of FIG. 1, except the mask is replaced with an LCD 60.

Generally, an LCD is made of an array of "pixels" that are individually controllable (e.g., individually controllable to be transparent or opaque for filtering/blocking light) by controlling the voltage (or current) applied to each cell/pixel. Accordingly, it is possible to easily change the pattern of the LCD by changing the respective control voltages for the pixels. Because the pixel pattern of an LCD selective light collector can be changed, there is no need to have a unique mask for tracking a unique set of celestial bodies. In some embodiments, the processor is programmed based on known star field maps, and the processor is configured to control the voltages to cause pixels of the LCD to respectively activate or deactivate to create a desired filter pattern in the LCD selective light collector. In this way, the LCD may be dynamically controlled by the processor to provide a dynamic mask that could change the pattern on a moment's notice. In some embodiments, the LCD can be dynamically controlled to selectively allow pass through of forward scattered light that corresponds to a first set of celestial bodies, and can be subsequently controlled to selectively allow forward scattered light that corresponds to a second set of celestial bodies.

The processor can control the LCD 60 in response to a rotation of the platform on which the system is supported. For example, in some embodiments, when the platform rotates, the processor can cause the LCD pattern to change to allow forward scattered light from a set of light sources to pass through the LCD.

The LCD 60 can replicate rotation and jitter of the mask without requiring rotation, jitter, or other mechanical movement of the LCD. The LCD does not have to physically move. While the LCD can be used with one or more selective light collector actuators 27, the LCD does not require selective light collector actuators. In some embodiments, the imaging optic, the LCD, the collection optic, and the light detector are supported on a platform, which is coupled to a frame. The LCD can compensate for rotation of the frame by selectively activating pixels of the LCD. For example, the LCD can compensate for physical rotation of the platform to allow the forward scattered light from a set of light sources to reach the detector. In some embodiments, a processor is configured to compare the intensity of the forward scattered light sensed by the light detector to a predetermined value. In some embodiments, the processor is configured to activate and/or deactivate one or more pixels in the LCD to maximize the intensity of light sensed by the light detector.

In some embodiments, the LCD can be used to selectively collect light by deactivating a set of pixels in the LCD to allow the forward scattered light to reach a detector, and then periodically deactivating one or more pixels in the set of pixels and activating one or more adjacent pixels in the LCD to either block or allow the forward scattered light to pass through to the detector. The detector senses fluctuations in the light intensity based on periodic activation and deactivation of the pixels in the LCD.

In some embodiments, the processor is capable of determining a navigational parameter based on a set of pixels that are deactivated (rendered transparent) when a maximum of forward scattered light is sensed by the detector.

In some embodiments, the processor adjusts the LCD pattern to confirm the accuracy of a light intensity measurement for a set of celestial bodies. For example, a processor may cause the LCD to deactivate a first set of pixels to allow forward scattered light from a first set of celestial bodies to reach the detector. Then the processor may cause the LCD to activate the first set of pixels and deactivate a second set of pixels to allow forward scattered light from a second set of celestial bodies to reach the detector. Then the processor can compare the intensity of light detected when the second set of pixels is deactivated to the intensity of light detected when the first set of pixels is deactivated. Then the processor can make a determination of whether the first set of pixels was properly selected to track the first set of celestial bodies.

If the system is properly oriented towards the sky, and if a first set of celestial bodies are of equal brightness with a second set of celestial bodies, then the forward scattered light from the first set of celestial bodies should be approximately equal to the forward scattered light from the second set of celestial bodies. If the LCD measures a light intensity that is below a threshold value for a first set of celestial bodies, a processor can control the LCD to check whether a light intensity for a second set of celestial bodies is equally low. If it is, the low light intensity associated with the first set of deactivated pixels may be due to heavy cloud coverage in the sky. If it is not, the system may not be properly oriented to track the first set of celestial bodies, and the processor can trigger an alert that the system needs to be reoriented.

FIG. 6 is a block diagram of an example of computing components forming a system 400 which may be configured to implement one or more aspects disclosed herein. The system 400 can be used to analyze the light intensity measured by the detector 24, control the platform actuators, and control the selective light collector actuators. The system 400 may be communicatively coupled to the one or more platform actuators. In some embodiments, the system 400 may be communicatively coupled to the one or more selective light collector actuators. In some embodiments, the system 400 may be communicatively coupled to the detector 24.

In some embodiments, the processor 406 of the system is connected to the detector 24, and the processor 406 is connected to one or more platform actuators and one or more selective light collector actuators. As discussed above, the processor 406 is configured to receive a light intensity signal from the detector 24. As discussed above, the processor 406 is configured to send a signal to one or more platform actuators and one or more selective light collector actuators based on the received light intensity signal from the detector 24.

In some embodiments, the processor 406 is at least one processor.

The system 400 may include for example a computing platform such as those based on Intel CORE-type processor, Motorola PowerPC, Sun UltraSPARC, Texas Instruments-DSP, Hewlett-Packard PA-RISC processors, or any other type of processor. System 400 may include specially-programmed, special-purpose hardware, for example, an application-specific integrated circuit (ASIC). Various aspects of the present disclosure may be implemented as specialized software executing on the system 400 such as that shown in FIG. 6.

The system 400 may include a processor/ASIC 406 connected to one or more memory devices 410, such as a disk drive, memory, flash memory or other device for storing data. Memory 410 may be used for storing programs and data during operation of the system 400. Components of the computer system 400 may be coupled by an interconnection mechanism 408, which may include one or more buses (e.g., between components that are integrated within a same machine) and/or a network (e.g., between components that reside on separate machines). The interconnection mechanism 408 enables communications (e.g., data, instructions) to be exchanged between components of the system 400. The system 400 also includes one or more input devices 404, which may include for example, a keyboard or a touch screen. The system 400 includes one or more output devices 402, which may include for example a display. In addition, the computer system 400 may contain one or more interfaces (not shown) that may connect the computer system 400 to a communication network, in addition or as an alternative to the interconnection mechanism 408.

The system 400 may include a storage system 412, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 410 that allows for faster access to the information by the processor/ASIC than does the medium. This memory 410 may be a volatile, random access memory such as a dynamic random access memory (DRAM) or static memory (SRAM). It may be located in storage system 412 or in memory system 410. The processor 406 may manipulate the data within the integrated circuit memory 410 and then copy the data to the storage 412 after processing is completed. A variety of mechanisms are known for managing data movement between storage 412 and the integrated circuit memory element 410, and the disclosure is not limited thereto. The disclosure is not limited to a particular memory system 410 or a storage system 412.

The system 400 may include a computer platform that is programmable using a high-level computer programming language. The system 400 may be also implemented using specially programmed, special purpose hardware, e.g., an ASIC. The system 400 may include a processor 406, which may be a commercially available processor such as the well-known Pentium class processor available from the Intel Corporation. Many other processors are available. The processor 406 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Figure 7:
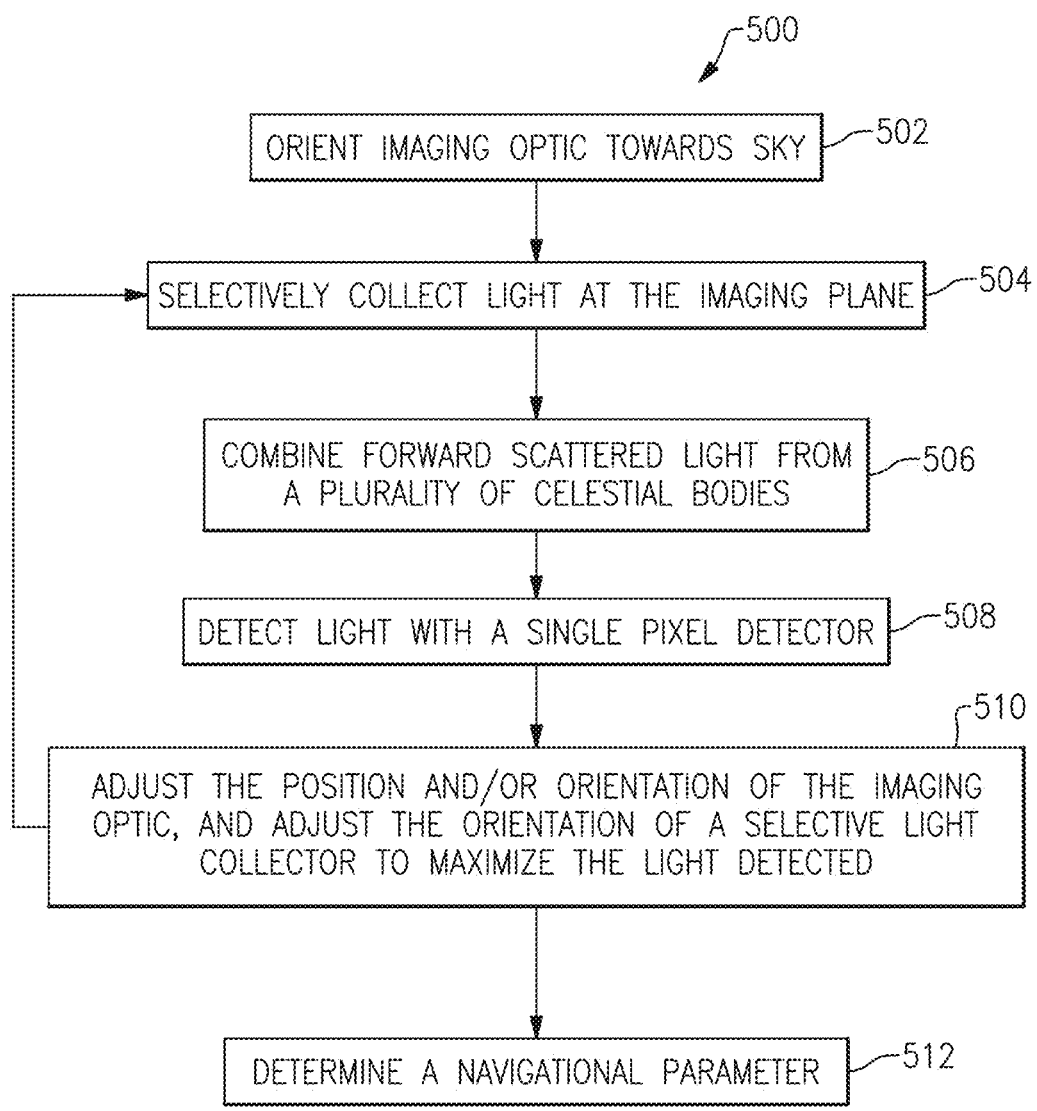
FIG. 7 is a flow diagram of one example of a method of tracking celestial bodies.

According to further aspects, a method of through-cloud celestial sighting is provided. FIG. 7 shows one embodiment of a method that can be used with any of the embodiments of the system disclosed herein.

In one embodiment of the method of wide field-of-view celestial sighting, the method 500 includes a step 502 of orienting an imaging optic to collect light from at least one light source, such as at least one celestial body, as discussed above. As also discussed above, the imaging optic may be secured to a platform that can be rotated or otherwise manipulated to orient the imaging optic in a desired direction.

In block 504, light is selectively collected from the at least one celestial body, for example, through a selective light collector secured to the platform and positioned in an imaging surface, such as an imaging plane, of the imaging optic.

In block 506, forward scattered light from the at least one celestial body is combined to provide a combined forward scattered light.

In block 508, a light intensity of the combined forward scattered light is measured/detected by a light detector.

In block 510, the position and/or orientation of the imaging optic is adjusted to maximize the light intensity detected by the light detector, and the orientation of a selective light collector is adjusted to maximize the light intensity detected by the light detector. In particular, in some embodiments, the method maximizes the light intensity of the forward scattered light that passes through the selective light collector by rotating the selective light collector about one or more axes and/or translating the selective light collector. In some embodiments, the one or more axes is two orthogonal axes.

In, block 510, adjusting the orientation of the selective light collector can further include oscillating the selective light collector about an optimal orientation associated with maximum detected light intensity to detect fluctuations in the light intensity based on oscillation of the light collector, and adjusting the orientation of the selective light collector to maximize the light intensity when the orientation associated with maximum detected light intensity changes. As discussed in relation to FIG. 1, the selective light collector actuator(s) are configured to oscillate the selective light collector actuator within the imaging plane, for example along the arrow E in FIG. 1. The selective light collector actuator(s) oscillates the selective light collector about an orientation set point that is matched to an optimal orientation. The optimal orientation is one that has a maximum detected light intensity. As the selective light collector oscillates, the light detector 24 detects fluctuations in the light intensity. The processor determines whether these fluctuations are associated with an increased light intensity at an orientation other than the orientation set point, and if so adjusts the orientation set point to match the new optimal orientation to maximize the light intensity.

As the position and orientation of the imaging optic is adjusted and as the orientation of the selective light collector is adjusted at block 510, the system continues to collect light at the imaging plane at block 504.

In block 512, the method determines a navigational parameter, such as a position or a heading of a vehicle on which the platform is secured. For example, embodiments of the method include determining a navigational parameter based on an adjustment to the orientation set point in block 510. The processor 406 is configured to analyze an amount of light sensed by the light detector. When the processor determines that a sufficient amount of light has been sensed by the light detector, the processor determines that the selective light collector is properly aligned. Then the processor compares the orientation of the selective light collector and to a set of known orientations of the selective light detector with respect to the platform, each which correspond to a known position and/or heading of a vehicle.

In some embodiments of the method in which the selective light collector is an LCD, the method further comprises determining a navigational parameter based on a set of pixels of the LCD that are deactivated when a maximum intensity of forward scattered light is sensed by the detector.

In some embodiments in which the selective light collector is an LCD and the platform is supported on a frame, the method further comprises compensating for rotation of the frame by selectively activating pixels of the LCD. The method may include rotating or translating the LCD, but this is not required. For example, instead of translating the LCD, the method can cause the LCD to selectively activate or deactivate pixels of the LCD to allow only the forward scattered light to pass through the LCD.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A method for determining a position of a star tracker sensing light from a plurality of celestial bodies, wherein the light passes through, and is scattered by, atmospheric clouds between the celestial bodies and the star tracker, the method comprising:
   disposing a light sensor in the star tracker;
   disposing a lens, in the star tracker, between the celestial bodies and the light sensor;
   disposing a mask between the lens and the light sensor, wherein the mask is configured to
   define a pattern of light-passing apertures there through, the pattern matching positions of the celestial bodies;
   admitting light through the lens from a cloudy sky having a plurality of celestial bodies whose light passes through, and is scattered by, atmospheric clouds between the celestial bodies and the lens;
   orienting the mask so as to maximize intensity of the light from the celestial bodies passing through the apertures and impinging on the light sensor; and
   automatically calculating a navigational parameter, based on orientation of the mask.

2. The method according to claim 1, further comprising oscillating the mask.

3. The method according to claim 1, further comprising:
   disposing a plurality of optical fibers between the mask and the light sensor; and
   conducting the light, via the plurality of optical fibers, to the light sensor.

4. The method according to claim 1, wherein disposing the mask comprises disposing a mask comprising a plurality of holes defining the light-passing apertures.

5. The method according to claim 1, wherein disposing the mask comprises disposing a liquid crystal display (LCD).

6. A star tracker for determining a navigational parameter by sensing light from a plurality of celestial light sources in the sky, the star tracker comprising:
   a lens configured to focus, onto an imaging surface, light emitted by a plurality of celestial light sources in the sky and subsequently forward scattered by atmospheric clouds disposed between the plurality of celestial light sources and the lens, the lens being configured to form an image of the plurality of celestial light sources on the imaging surface;
   a selective light collector disposed in the imaging surface and configured to define a pattern of apertures, wherein the pattern matches positions of a selected set of the celestial light sources in the sky, each aperture being configured to:
   allow forward-scattered light from a respective one of the selected set of celestial light sources to pass through the selective light collector; and
   at least partially block other scattered light;
   a detector comprising a plurality of photo-sensitive pixels arranged in an array, each pixel being configured to receive, from the selective light collector, forward-scattered light from a respective different portion of the sky of a plurality of portions of the sky; and
   a processor coupled to the detector and configured to:
   receive a light intensity signal from the detector;
   monitor the plurality of portions of the sky to thereby track a plurality of celestial bodies;
   orient the selective light collector in response to intensity of light sensed by the detector; and
   determine a navigational parameter based at least in part on orientation of the selective light collector.

7. The star tracker according to claim 6, wherein the selective light collector comprises a mask.

8. The star tracker according to claim 6, wherein the selective light collector comprises a liquid crystal display (LCD).

9. The star tracker according to claim 6, wherein the selective light collector comprises a plurality of optical fibers.

* * * * *